United States Patent
Chan

(10) Patent No.: US 7,512,429 B2
(45) Date of Patent: Mar. 31, 2009

(54) ERECT MOBILE PHONE DEVICE

(75) Inventor: Tien-Ming Chan, Taipei (TW)

(73) Assignee: Inventec Corporation, Taipei (TW)

( * ) Notice: Subject to any disclaimer, the term of this patent is extended or adjusted under 35 U.S.C. 154(b) by 427 days.

(21) Appl. No.: 11/329,049

(22) Filed: Jan. 11, 2006

(65) Prior Publication Data
US 2007/0161397 A1 Jul. 12, 2007

(51) Int. Cl.
*H04M 1/00* (2006.01)
(52) U.S. Cl. .............. 455/575.3; 455/575.4; 455/556.1; 379/433.13; 345/169
(58) Field of Classification Search .............. 455/575.3, 455/575.4, 556.1; 379/433.13; 345/169
See application file for complete search history.

(56) References Cited

U.S. PATENT DOCUMENTS

| | | | |
|---|---|---|---|
| 6,850,226 B2* | 2/2005 | Finke-Anlauff | 345/169 |
| 7,133,691 B2* | 11/2006 | Kang | 455/556.1 |
| 7,162,030 B2* | 1/2007 | Bell et al. | 379/433.13 |
| 2006/0111160 A1* | 5/2006 | Lin et al. | 455/575.3 |
| 2006/0270455 A1* | 11/2006 | Zuo et al. | 455/558 |

* cited by examiner

*Primary Examiner*—Danh C Le
(74) *Attorney, Agent, or Firm*—Bacon & Thomas, PLLC

(57) ABSTRACT

An erect mobile phone device comprises a main body having a sunken area, a direction key set on a side of the sunken area, and a press key portion on the same side of the sunken area of the main body; a display screen portion having a screen on a side of the display screen portion able to be accommodated in the sunken area or turned outward from the sunken area; and a connecting portion with one end pivotally coupled to the display screen portion and with another end pivotally coupled to the main body on a side proximate to the sunken area, such that the display screen portion can be rotated on the connecting portion and turned outward from the sunken area to an angle or accommodated in the sunken area through the connecting portion.

6 Claims, 3 Drawing Sheets

ERECT MOBILE PHONE DEVICE

FIELD OF THE INVENTION

The present invention relates to a mobile phone device, and more particularly to an erect mobile phone device whose screen display can be turned out from the main body of the mobile phone device to provide a convenient operating and viewing angle.

BACKGROUND OF THE INVENTION

As the information and electronic industries bloom, high-tech products derived from computers and mobile communications are developed rapidly, and these products are closely related to our daily life that shorten the distance between people as well as the time and space. Electronic products such as mobile phones, persona digital assistant (PDA), and other handheld computers become popular and extensively used. With manufacturers' promotions, the competition in the market becomes severer and major communication companies constantly introduce innovative products and services to attract users, and thus users have a higher demand on the use of electronic communication products. The convenience and effective service of the electron communication products become an important index for evaluating the manufacturing technology of high-tech products in a country.

Particularly, mobile phones are used more extensively in our daily life, and the function of the mobile phones not only includes taking photos, playing MP3 music, or playing games, but also provides a multimedia playback function. The multimedia playback function of a mobile phone provides users a function of watching TV programs and movies. Referring to FIG. 1, a mobile phone 100 comes with a screen 200, which is generally an erect screen, such that when a user watches a movie or a TV program, the user cannot view the wide screen of the movie or TV program by the erect screen of the mobile phone, or playing a movie or TV program on an erect screen, and the pixel of the movie or TV program is forced to a down scale to comply with the features of the erect screen. However, the images of the movie or TV program displayed on the erect screen are usually flattened.

Further, the mobile phone device also provides games such as motion type games or intellectual type games for users to play and such games not only attract users to operate the mobile phone with full attention, but the mobile phone also provides users a place for showing off their skill Since the prior art mobile phone is light, thin, short, and compact, and the space available for arranging the keys 300 is very limited. Foreigners or people having a larger palm usually cannot hold the mobile phone 100 by both hands, or users having wider fingers usually press several keys 300 at a time or a wrong key 300 while playing a game by the mobile phone, and thus causing inconvenience and distraction to the operator. Therefore, finding a way of designing an erect mobile phone device that allows an operator to enjoy and concentrate on the games provided by the mobile phone is definitely an important issue for electronic communication product designers and manufacturers to overcome.

SUMMARY OF THE INVENTION

In view of the shortcomings of the prior art, the inventor of the present invention based on years of experience to conduct extensive researches and experiments, and finally invented an erect mobile phone device in accordance with the present invention.

Therefore, it is a primary objective of the present invention to provide an erect mobile phone device that comprises a main body with a side pivotally coupled to a connecting portion, and an end of the connecting portion that is opposite to the main body pivotally coupled to a display screen portion, and the display screen portion can be rotated freely on the connecting portion. The main body includes a sunken area disposed on a side of the main body and a direction key set disposed at a surface facing the sunken area. The main body includes a press key portion disposed on the same side with the sunken area, and the sunken area can be accommodated precisely in the display screen portion, such that a screen disposed on a side of the display screen portion is exposed from the surface of the main body. If the connecting portion drives the display screen portion to turn outward to an angle from the main body, and the feature of the display screen portion capable of being rotated freely on the connecting portion turns the screen in a direction to provide a convenient operating and viewing angle for viewing audio and video files or playing games.

Another objective of the present invention is to install a protruding axle extended outward separately from two pivoting portions, and a spring sheathed separately into the two protruding axles, and one end of the two springs is fixed with the connecting portion, and another end of the two springs is fixed with the main body. When the display screen portion is turned outward from the main body by an external force and press the two springs, the two springs produce a resilience to resist the external force and constantly drive the display screen portion to turn outward.

A further objective of the present invention is to install a first fixing portion disposed on the display screen portion at a position opposite to the screen and at an end away from the connecting portion. The main body includes a second fixing portion disposed on the sunken area and corresponding to the first fixing portion. If the external force is larger than the resilience of the spring, and the display screen portion is accommodated in the sunken area, the first fixing portion will be latched to the second fixing portion, such that the display screen portion cannot be separated from the sunken area easily, but integrated with the main body to form the erect mobile phone device.

A further objective of the present invention is to install a release button disposed on the main body and at a lateral side opposite to the connecting portion, and the release button can separate the first fixing portion from the second fixing portion, and the resilience of the spring can drive the display screen portion to be turned outward.

Another further objective of the present invention is to set a sunken area on a side opposite to the screen and facing the display screen portion, such that the sunken area can prevent the direction key set from being pressed by the display screen portion.

The above and other objects, features and advantages of the present invention will become apparent from the following detailed description taken with the accompanying drawings.

DETAILED DESCRIPTION OF THE PREFERRED EMBODIMENTS

Figure 1:
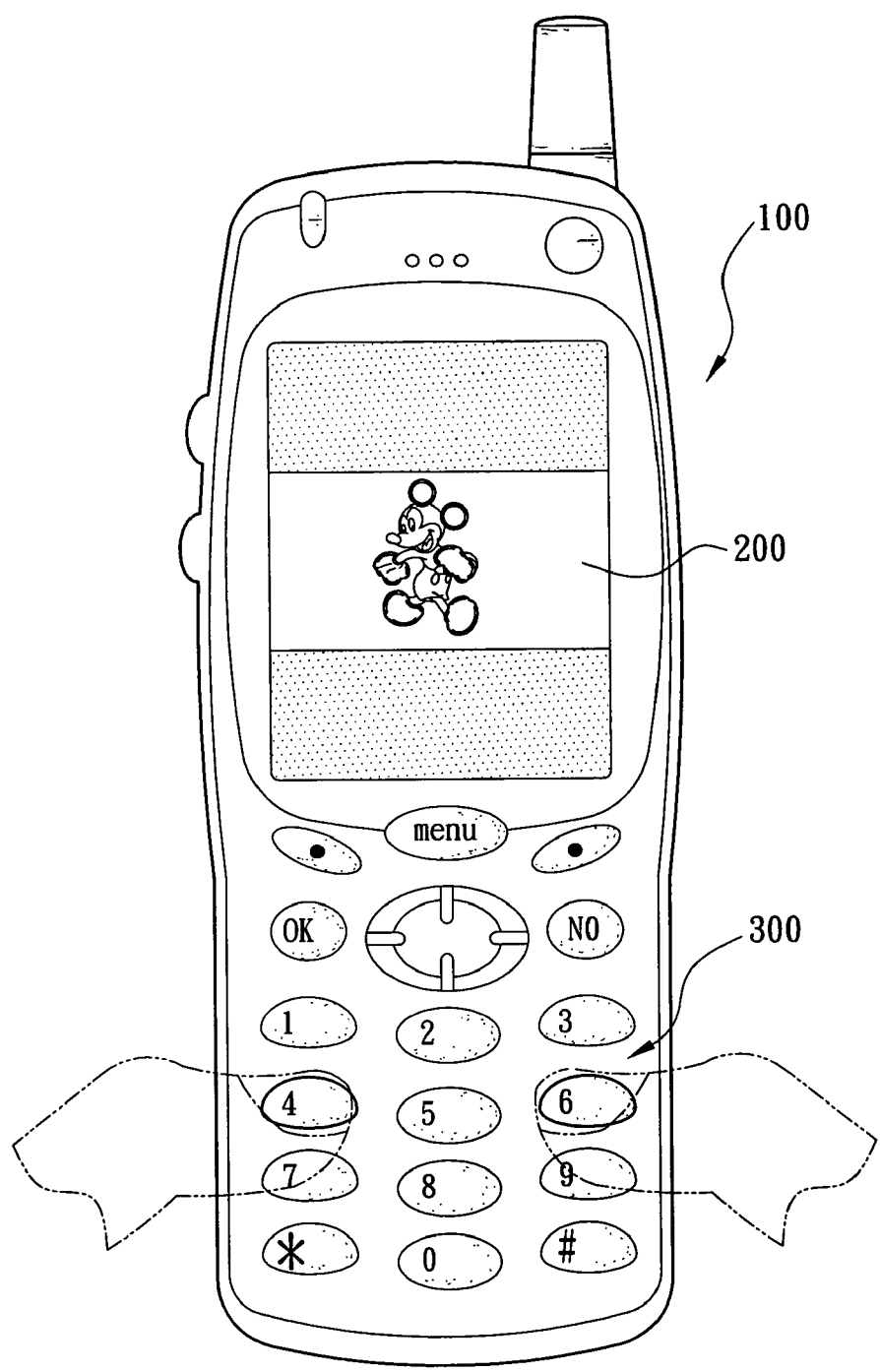
FIG. 1 is a schematic view of a prior art.
Figure 2:
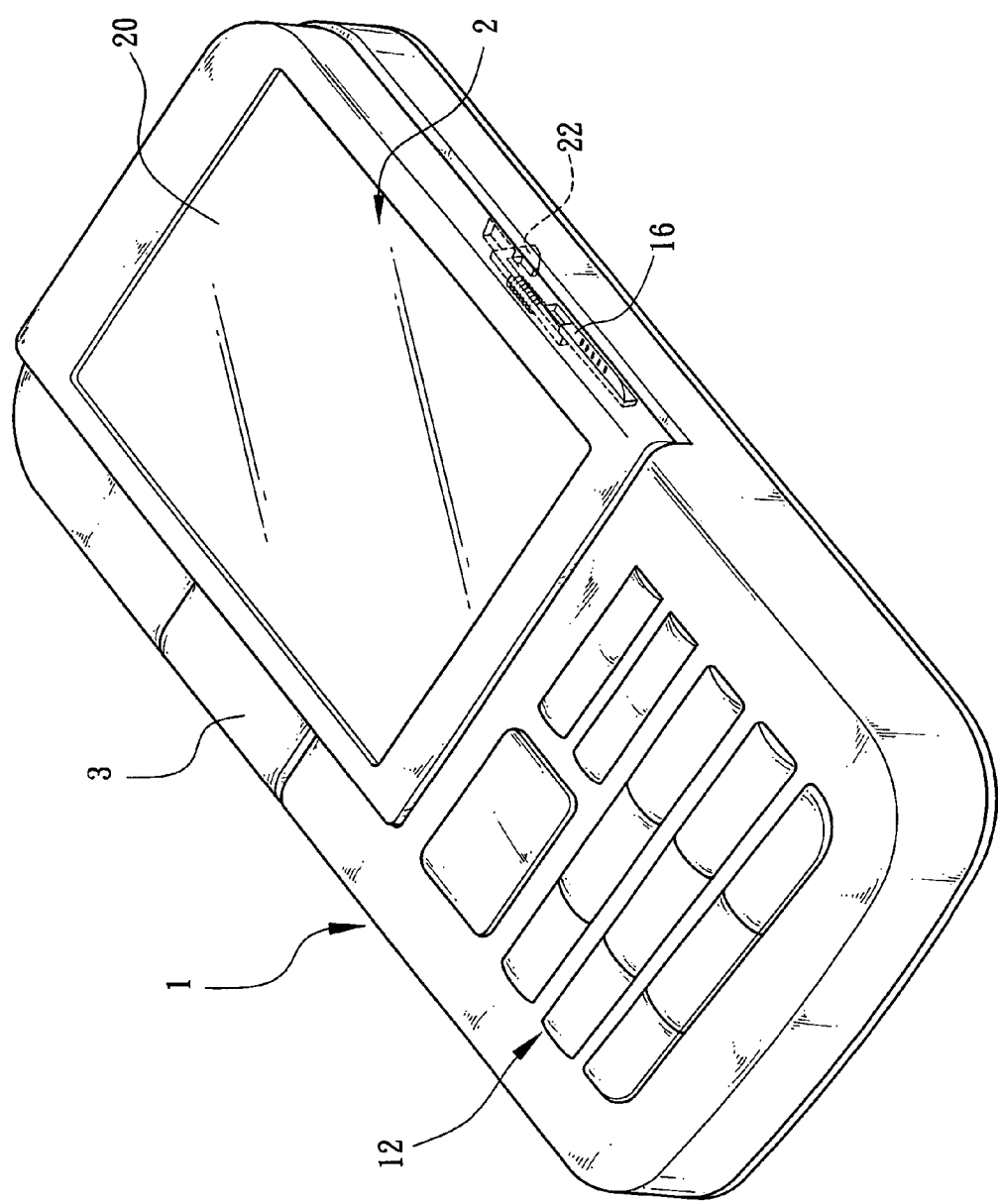
FIG. 2 is a schematic view of a preferred embodiment of the present invention.
Figure 3:
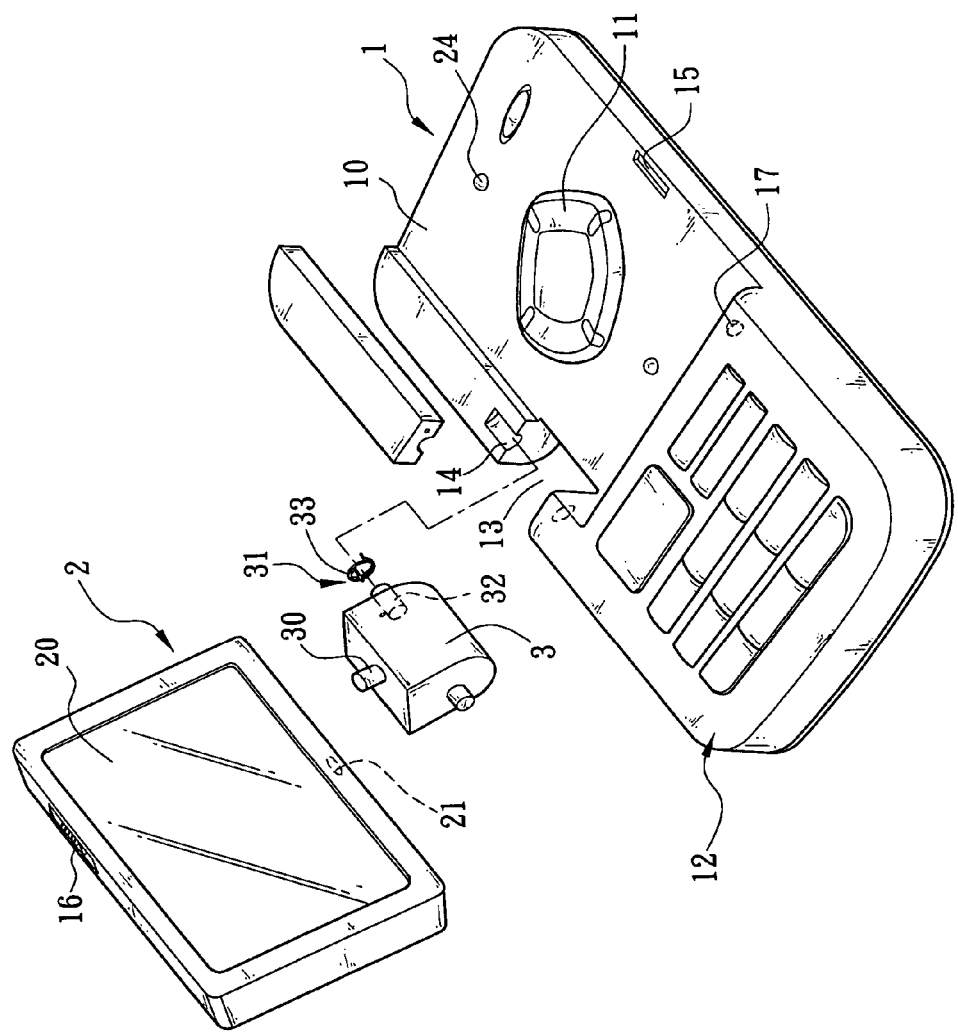
FIG. 3 is an exploded view of the present invention.

Referring to FIGS. 2 and 3 for the preferred embodiment of the present invention, an erect mobile phone device such as a mobile phone or a personal digital assistant (PDA) comprises a main body 1, a display screen portion 2, and a connecting portion 3, and the main body 1 at its side has a sunken area 10, and the sunken area 10 at its surface has a direction key set 11, and the main body 1 has a press key portion 12 at a side of the sunken area 10, and the sunken area 10 can precisely accommodate the display screen portion 2, so that a screen 20 such as a touch panel disposed on a side of the display screen portion 2 is exposed from the surface of the main body 1. A lateral side of the display screen portion 2 is pivotally coupled to an end of the connecting portion 3, such that the display screen portion 2 can be rotated freely on the connecting portion 3, and an end of the connecting portion 3 away from an end of the display screen portion 2 is pivotally coupled to a lateral side of the main body 1 proximate to the sunken area 10. The connecting portion 3 can separate the display screen portion 2 from the sunken area 10 and turn outward to an angle, such that the feature of the display screen portion 2 capable of being rotated freely on the connecting portion 3 turns the screen 20 to a convenient operating and viewing angle for viewing audio and video files or playing games.

Referring to FIG. 3, a first pivotal connecting portion 30 (such as a protruding axle or a groove) is disposed at a position where the connecting portion 3 and the display screen portion 2 are coupled, and the connecting portion 3 includes a second pivoting portion 31 (such as a protruding axle or a groove) disposed separately on both sides opposite to the first pivotal connecting portion 30, and a side of the display screen portion 2 facing the first pivotal connecting portion 30 includes a third pivotal connecting portion 21 (such as a groove or a protruding axle). After the third pivotal connecting portion 21 is coupled to the first pivotal connecting portion 30 correspondingly, the display screen portion 2 can be rotated freely on the connecting portion 3. The main body 1 includes a slot 13 at a position facing the connecting portion 3, and the slot 13 can accommodate an end of the connecting portion 3, and a fourth pivoting portion 14 (such as a groove or a protruding axle) is disposed separately on both sides of the slot 13, such that an end of the connecting portion 3 can be placed into the slot 13, and the two second pivoting portions 31 are coupled with the two fourth pivoting portions 14 respectively, and the connecting portion 3 can be turned at a lateral side of the main body 1.

When the display screen portion 2 is turned outward from the main body 1, a user can operate the mobile phone device more conveniently. If it is not necessary to turn the display screen portion 2 out from the main body 1, the display screen portion 2 will not shake the outside of the main body 1 or damage the related components of the display screen portion 2. Referring to FIG. 3 for another preferred embodiment of the present invention, a protruding axle 32 is extended outward separately from both sides of the two pivoting portions 31, and the protruding axle 32 includes a spring 33. One end of the spring 33 is coupled to the connecting portion 3, and another end of the spring 33 is coupled to the main body 1. The display screen portion 2 is turned out from the main body 1 by an external force, such that when the spring 33 is pressed and deformed, the spring 33 produces a resilience to resist the external force and continuously forces the display screen portion 2 to move out from the main body 1.

Referring to FIGS. 2 and 3, the display screen portion 2 includes a first fixing portion 22 (such as a hook) at an end opposite to the screen 20 and away from the connecting portion 3, and the main body 1 at the sunken area 10 also includes a second fixing portion 15 (such as a groove) corresponding to the first fixing portion 22. If the external force is larger than the resilience of the spring 33, and the display screen portion 2 is accommodated in the sunken area 10, the first fixing portion 22 will be latched with the second fixing portion 15, such that the display screen portion 2 cannot be separated from the sunken area 10, but integrated with the main body 1 to form the erect mobile phone device. The main body 1 at a side opposite to the connecting portion 3 includes a release button 16, and the release button 16 can separate the first fixing portion 22 and the second fixing portion 15. The resilience of the spring 33 drives the display screen portion 2 to turn out from the sunken area 10 to a certain specific position, so that the display screen portion 2 allows a better operation for viewing audio and video files or playing games.

If the display screen portion 2 is not accommodated in the sunken area 10, the display screen portion 2 will press the direction key set 11, and thus exhausting the elasticity or damaging the direction key set 11. In the preferred embodiment as shown in FIG. 3, the main body 1 includes at least one vertex 24 in the sunken area 10, and each vertex 24 can block a side of the display screen portion 2 opposite to the screen 20, such that when the display screen portion 2 is accommodated in the main body 1, the direction key set 11 will not be pressed by the display screen portion 2.

In the preferred embodiment as shown in FIG. 3, the main body 1 includes a detecting device 17 on a surface facing the sunken area 10, and the detecting device 17 can determine whether or not to change the angle of viewing images on the screen 20 according to the position of the display screen portion 2 on the main body 1. If the display screen portion 2 is accommodated in the sunken area 10 of the main body 1, the detecting device 17 will provide a viewing angle of the screen 20 to fit the erect communication device. On the other hand, if the display screen portion 2 is turned out from the main body 1, the detecting device 17 will convert the image of the screen 20 into a positive intersecting angle to facilitate the viewing of audio and video files and playing games.

While the invention herein disclosed has been described by means of specific embodiments, numerous modifications and variations could be made thereto by those skilled in the art without departing from the scope and spirit of the invention set forth in the claims.

What is claimed is:

1. An erect mobile phone device, comprising:
   a main body, having a sunken area disposed on a side of said main body, a direction key set disposed on a side of said sunken area, a press key portion disposed on the same side of said sunken area of said main body, and a slot disposed at an end of said main body adjacent to said sunken area, wherein said slot includes a fourth pivoting portion disposed separately on both sides of said slot;
   a display screen portion, precisely accommodated in said sunken area, and having a screen disposed on a side of said display screen portion and exposed from the surface of said main body, wherein said screen portion includes a third pivotal connecting portion disposed at a lateral side of said display;
   a connecting portion, accommodated in said slot, and having a first pivotal connecting portion disposed at an end of said connecting portion and pivotally coupled to said third pivotal connecting portion disposed at the lateral side of said display screen portion, and having a second pivoting portion disposed separately on two opposite ends of said connecting portion away from said display screen portion and pivotally coupled to said fourth pivoting portion of said slot, such that said display screen portion can be movably rotated on said connecting portion, and said connecting portion can drive said display screen portion to be separated from said sunken area and turned outward to an angle or accommodated in said sunken area.

2. The erect mobile phone device of claim 1, wherein said two second pivoting portions are individually and outwardly extended protruding axles, and said each protruding axle includes a spring, and an end of said spring is coupled to said connecting portion, and the other end of said spring is coupled to said main body, and a resilience produced by said spring constantly forces said display screen portion to move out from said main body.

3. The erect mobile phone device of claim 2, wherein said display screen portion includes a first fixing portion disposed opposite to said screen and at an end away from said connecting portion, and said main body includes a second fixing portion disposed on said sunken area and corresponding to said first fixing portion, and said second fixing portion and said first fixing portion are engaged with each other for stopping said two springs to constantly drive said display screen portion to move outward.

4. The erect mobile phone device of claim 3, wherein said main body includes a release button disposed at a position away from a lateral side of said connecting portion for separating said first fixing portion from said second fixing portion.

5. The erect mobile phone device of claim 3, wherein said main body includes at least one vertex in said sunken area, and said each vertex supports said display screen at a side opposite to said screen when said display screen portion is contained into said main body for preventing said direction key from being pressed.

6. The erect mobile phone device of claim 3, wherein said main body includes a detecting device disposed at a position facing the surface of said sunken area, and said screen will change its angle of displaying an image if said detecting device detects that said display screen portion is situated at said sunken area.

* * * * *